United States Patent
Zhao et al.

(10) Patent No.: US 10,547,173 B2
(45) Date of Patent: Jan. 28, 2020

(54) POWER GENERATION SYSTEM

(71) Applicant: GENERAL ELECTRIC COMPANY, Schenectady, NY (US)

(72) Inventors: Tong Zhao, Shanghai (CN); Rong Li, Shanghai (CN); Xu Fu, Shanghai (CN)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 15/161,641

(22) Filed: May 23, 2016

(65) Prior Publication Data
US 2016/0352102 A1 Dec. 1, 2016

(30) Foreign Application Priority Data

May 26, 2015 (CN) .......................... 2015 1 0274190

(51) Int. Cl.
| | |
|---|---|
| *F03D 9/11* | (2016.01) |
| *H02J 1/10* | (2006.01) |
| *F03D 7/04* | (2006.01) |
| *H02J 3/32* | (2006.01) |
| *H02J 3/38* | (2006.01) |

(52) U.S. Cl.
CPC ............. *H02J 1/10* (2013.01); *F03D 7/048* (2013.01); *F03D 9/11* (2016.05); *F05B 2270/502* (2013.01)

(58) Field of Classification Search
None
See application file for complete search history.

(56) References Cited

U.S. PATENT DOCUMENTS

| | | | |
|---|---|---|---|
| 7,952,232 B2 | 5/2011 | Burra et al. | |
| 8,227,929 B2 * | 7/2012 | Burra | H02J 3/24 290/44 |
| 8,688,281 B2 | 4/2014 | Viassolo et al. | |

(Continued)

FOREIGN PATENT DOCUMENTS

| | | |
|---|---|---|
| CN | 102460899 A | 5/2012 |
| CN | 103208810 A | 7/2013 |

(Continued)

OTHER PUBLICATIONS

Yao, D.L. et al. "Determination of Short-Term Power Dispatch Schedule for a Wind Farm Incorporated With Dual-Battery Energy Storage Scheme", Sustainable Energy, IEEE Transactions on, vol. 3, Issue: 1, pp. 74-84, Jan. 2012.

(Continued)

*Primary Examiner* — Jared Fureman
*Assistant Examiner* — James P Evans
(74) *Attorney, Agent, or Firm* — Dority & Manning, P.A.

(57) ABSTRACT

A power generation system comprising a plurality of power generation units; a plurality of energy storage units; a plurality of switch units for connecting or disconnecting the power generation units and the energy storage units; and a controller for controlling the switch units to disconnect one or more idle power generation units from their corresponding energy storage units when the idle power generation units stop operating and to connect the disconnected energy storage unit to one operating power generation unit of the plurality of power generation units based on states-of-charge of the energy storage units. The power generation system may make best use of the energy storage units.

9 Claims, 5 Drawing Sheets

(56) References Cited

U.S. PATENT DOCUMENTS

| | | | |
|---|---|---|---|
| 8,860,236 B2 | 10/2014 | Nasiri | |
| 2004/0102109 A1* | 5/2004 | Cratty | B63H 21/17 440/113 |
| 2004/0130292 A1* | 7/2004 | Buchanan | B60L 11/1811 320/116 |
| 2005/0093508 A1* | 5/2005 | Taniguchi | H02J 7/1423 320/104 |
| 2009/0174259 A1* | 7/2009 | Lin | H02J 7/35 307/65 |
| 2011/0082598 A1* | 4/2011 | Boretto | G06Q 10/06 700/291 |
| 2012/0043760 A1* | 2/2012 | Hagedorn | F03D 7/0224 290/44 |
| 2013/0056986 A1 | 3/2013 | Jeong et al. | |
| 2013/0099581 A1* | 4/2013 | Zhou | H02J 1/12 307/82 |
| 2014/0132064 A1* | 5/2014 | Kennedy | B63H 23/24 307/9.1 |
| 2014/0211422 A1* | 7/2014 | Wright | H05K 7/20945 361/724 |
| 2014/0345667 A1* | 11/2014 | Hudson | H01L 31/05 136/244 |
| 2015/0022004 A1* | 1/2015 | Okuda | H02J 3/32 307/66 |
| 2015/0061409 A1* | 3/2015 | Dunton | H01L 31/02021 307/115 |
| 2015/0102667 A1* | 4/2015 | Zhao | B60L 11/1803 307/10.1 |
| 2015/0108755 A1* | 4/2015 | Das | F01D 15/10 290/43 |
| 2015/0148975 A1* | 5/2015 | Jeong | H02J 3/32 700/287 |
| 2015/0263569 A1* | 9/2015 | Brogan | H02J 3/36 290/44 |
| 2015/0303692 A1* | 10/2015 | Spotti | H02J 3/14 307/19 |
| 2017/0074244 A1* | 3/2017 | Huang | H02J 3/386 |
| 2017/0310112 A1* | 10/2017 | Goasguen | H02J 3/32 |

FOREIGN PATENT DOCUMENTS

| | | |
|---|---|---|
| CN | 103310306 A | 9/2013 |
| CN | 203180598 U | 9/2013 |
| CN | 103178538 B | 12/2014 |
| CN | 103236708 B | 12/2014 |
| CN | 103401262 B | 12/2014 |
| EP | 2110549 A2 | 10/2009 |
| EP | 2339713 A2 | 6/2011 |
| WO | 2012/068618 A1 | 5/2012 |
| WO | 2014/072793 A1 | 5/2014 |

OTHER PUBLICATIONS

Babazadeh, H. et al., "Controller design for a Hybrid Energy Storage System enabling longer battery life in wind turbine generators", North American Power Symposium (NAPS), 2011, pp. 1-7, Aug. 4-6, 2011, Boston, MA.

Gee, A.M. et al., "Analysis of Battery Lifetime Extension in a Small-Scale Wind-Energy System Using Supercapacitors", Energy Conversion, IEEE Transactions on, vol. 28, Issue: 1, pp. 24-33, Mar. 2013.

Li et al., "Real-Time Simulation of a Wind Turbine Generator Coupled With a Battery Supercapacitor Energy Storage System", Industrial Electronics, IEEE Transactions on, vol. 57, Issue: 4, pp. 1137-1145, Apr. 2010.

Babazadeh, H. et al., "Sizing of battery and supercapacitor in a hybrid energy storage system for wind turbines," Transmission and Distribution Conference and Exposition (T&D), 2012 IEEE PES, pp. 1-7, May 7-10, 2012.

Mendis, N. et al., "Management of Battery-Supercapacitor Hybrid Energy Storage and Synchronous Condenser for Isolated Operation of PMSG Based Variable-Speed Wind Turbine Generating Systems", Smart Grid, IEEE Transactions on, vol. 5, Issue: 2 , pp. 944-953, Mar. 2014.

Gao et al., "Power enhancement of an actively controlled battery/ ultracapacitor hybrid," Power Electronics, IEEE Transactions on, vol. 20, Issue: 1, pp. 236-243, Jan. 2005.

Mendis, N. et al. "Active power management of a super capacitor-battery hybrid energy storage system for standalone operation of DFIG based wind turbines", Industry Applications Society Annual Meeting (IAS), 2012 IEEE , pp. 1-8, Oct. 7-11, 2012.

Schneider Electric, "Masterpact NW DC Circuit Breakers", Catalog 0613CT0501R1/07, 2007.

Mandic et al., "Lithium-Ion Capacitor Energy Storage Integrated with Variable Speed Wind Turbines for Power Smoothing", IEEE Journal of Emerging and Selected Topics in Power Electronics, IEEE, Piscataway, vol. No. 1, Issue No. 4, pp. 287-295, Dec. 1, 2013, NJ, USA.

European Search Report and written opinion issued in connection with corresponding EP Application No. 16170867.2 dated Oct. 6, 2016.

Machine Translation of First Office Action and Search issued in connection with corresponding CN Application No. 201510274190.0 dated May 23, 2018.

Machine Translation of Second Office Action and Search issued in connection with corresponding CN Application No. 201510274190.0 dated Nov. 20, 2018.

* cited by examiner

POWER GENERATION SYSTEM

BACKGROUND

Embodiments of the present invention relate to a power generation system, particularly to a power generation system having a plurality of energy storage units and a plurality of power generation units.

Nowadays it has been a trend and has been used more and more widely to generate power using a renewable energy. For example, wind power, it has become the third largest power supply of the country. Generally, a wind farm is provided with a plurality of fans, which receive wind energy and convert the wind energy into electric energy respectively supplied to the power grid. Each fan has a wind turbine, an AC generator, a rectifier and the like to form a power generation unit for converting wind energy into electric energy. Each fan also has an energy storage unit, which may store a part of electric energy when the generated electric energy is relatively more and may also release a part of electric energy to the power grid when the generated electric energy is relatively less. Sometimes part of the fans in the wind farm would stop operation, for example, the power generation unit of the fan fails or needs maintenance and thus stops operation, the fan stops operation when wind is poor, or some other conditions under which the power generation unit of the fan stops operation. Since each fan is operating independently, the energy storage unit is in an idle state at this moment, thus causing a waste of resource.

Accordingly, it is necessary to provide a system for solving at least one of the above mentioned technical problems.

BRIEF SUMMARY OF THE INVENTION

One aspect of the present invention is to provide a power generation system. The power generation system comprises: a plurality of power generation units; a plurality of energy storage units; a plurality of switch units for connecting or disconnecting the power generation units and the energy storage units; and a controller for controlling the switch units to disconnect one or more idle power generation units from their corresponding energy storage units when the idle power generation units stop operating and to connect the disconnected energy storage unit to one operating power generation unit of the plurality of power generation units based on states-of-charge of the energy storage units.

BRIEF DESCRIPTION OF THE DRAWINGS

The present disclosure can be better understood in light of description of embodiments of the present disclosure with reference to the accompanying drawings, in which.

DETAILED DESCRIPTION

Unless defined otherwise, the technical or scientific terms used herein should have the same meanings as commonly understood by one of ordinary skilled in the art to which the present invention belongs. The terms "comprises", "comprising", "includes", "including" or the like in the Description and Claims of the present application mean that the element or object in front of the "comprises", "comprising", "includes" or "including" covers the elements or objects and their equivalents illustrated following the "comprises", "comprising", "includes" or "including", but do not exclude other elements or objects. The terms "first", "second" and the like in the Description and the Claims of the present application for invention do not mean any sequential order, number or importance, but are only used for distinguishing different components.

Figure 1:
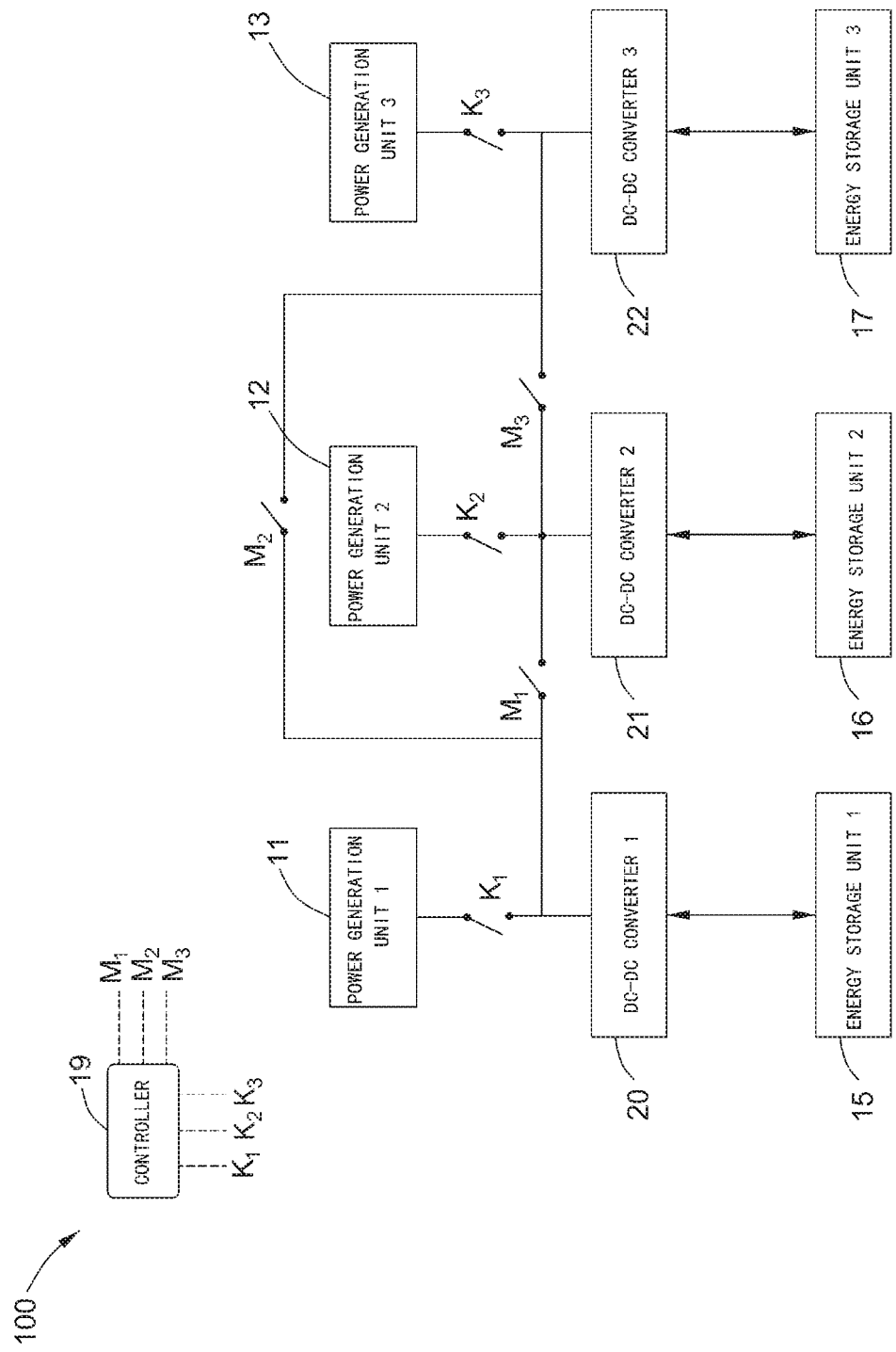
FIG. 1 illustrates a schematic block diagram of one embodiment of a power generation system of the present invention.

FIG. 1 illustrates a schematic block diagram of a power generation system 100 of one embodiment. In the present embodiment, the power generation system 100 is a wind power system, but is not limited thereto. The power generation system 100 comprises a plurality of power generation units 11-13, a plurality of energy storage units 15-17, a plurality of switch units $K_1$-$K_3$, $M_1$-$M_3$ and a controller 19. In the present embodiment, each of the power generation units 11-13 comprises a wind turbine (not shown), an AC generator (not shown) and a rectifier (not shown). The power generation units 11-13 may convert wind energy into electric energy. In other embodiments, the power generation units 11-13 may be other forms of power generation units, for example, solar power generation units. Only for illustration, the figure only shows three power generation units 11-13 and their corresponding energy storage units 15-17, however, the numbers of the power generation units and the energy storage units may be determined according to the practical application and the scale of the actual wind farm.

The energy storage units 15-17 correspond to the power generation units 11-13 respectively. The energy storage units 15-17 may be used to store the excessive electric energy generated by the power generation units 11-13, and may also release a part of electric energy to the power grid when the electric energy generated by the power generation units 11-13 is not sufficient. Each of the energy storage units 15-17 may have one or more energy storage means, for example, batteries, super capacitors or combinations of the two. In the present embodiment, the energy storage units 15-17 are connected to the power generation units 11-13 via DC-DC converts 20-22. The DC-DC converters 20-22 may regulate a voltage level of a DC voltage from a DC bus, outputting the DC voltage to the energy storage units 15-17, and may also regulate the voltage level of the DC voltage output by the energy storage units 15-17, outputting the DC voltage to the DC bus.

The switch units $K_1$-$K_3$, $M_1$-$M_3$ are used to connect or disconnect the power generation units 11-13 and the energy storage units 15-17. The switch units $K_1$-$K_3$, $M_1$-$M_3$ comprise a plurality of first switch units $K_1$-$K_3$ and a plurality of second switch units $M_1$-$M_3$. Each of the power generation units 11-13 may be connected to the corresponding energy storage units 15-17 via the first switch units $K_1$-$K_3$ and may be connected to the other energy storage units 15-17 via the second switch units $M_1$-$M_3$. For example, in the embodiment as shown in the figure, the power generation unit 11 may be electrically connected to the corresponding energy storage unit 15 via the first switch unit $K_1$, and may also be electrically connected to the energy storage unit 16 and the energy storage unit 17 via the second switch units $M_1$ and $M_2$. Similarly, the power generation unit 12 may be electrically connected to the energy storage units 15-17, and the power generation unit 13 may be electrically connected to the energy storage units 15-17. However at the same moment, one of the energy storage units 15-17 is only electrically connected to one of the power generation units 12-13. If one energy storage unit is electrically connected to a plurality of power generation units simultaneously, when the electric energies generated by the power generation units are different from each other, the voltages of the respective DC voltage buses are not equal, thus damaging the energy storage units connected to the DC voltage buses.

The controller 19 may be used to control opening and closing of the switch units $K_1$-$K_3$, $M_1$-$M_3$. The switch units $K_1$-$K_3$, $M_1$-$M_3$ are physically connected between the power generation units 11-13 and the energy storage units 15-17, and the opening and closing of the switch units $K_1$-$K_3$, $M_1$-$M_3$ decides an electrical connection relationship between the power generation units 11-13 and the energy storage units 15-17. In one embodiment, the controller 19 may also control the power generation units 11-13, the DC-DC converters 20-22 and the like. In one embodiment, the controller 19 may comprise a wind farm controller, a wind turbine controller, a power converter controller and a discharge-charge controller, which may serve as separate elements, and may also be integrated into one element. The figure only shows a part of elements of the power generation system 100 in forms of module block diagrams. The power generation system 100 also comprises a number of other elements, e.g., an AC-DC converter, a DC-AC converter and the like.

Figure 2:
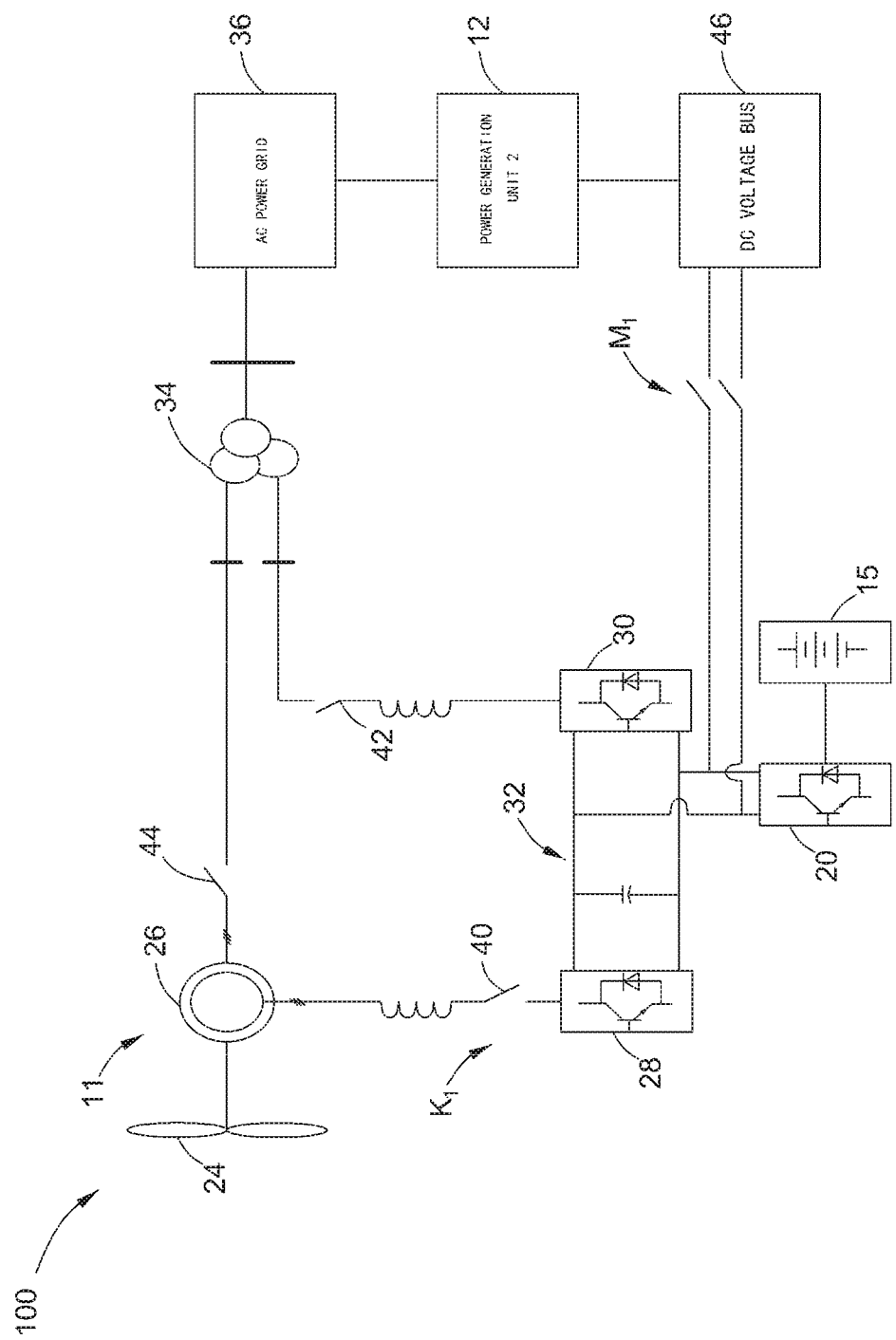
FIG. 2 illustrates a partial structural schematic diagram of one embodiment of the power generation system of the present invention.

FIG. 2 illustrates a partial structural schematic diagram of one embodiment of the power generation system 100. The power generation unit 11 comprises a wind turbine 24 and an AC generator 26. The wind turbine 24 is used to rotate in response to the wind in contact with the wind turbine, to drive the AC generator 26, thus making the AC generator 26 output an AC voltage. A rotor-side converter 28 (or referred to as a rectifier) is used to receive an AC voltage from the AC generator 26, and to rectify the AC voltage to obtain a DC voltage. The rotor-side converter 28 outputs the DC voltage onto a DC voltage bus 32. The DC voltage bus 32 transmits the DC voltage onto a grid-side converter 30 (or referred to as a converter) and the DC-DC converter 20.

The grid-side converter 30 is used to receive the DC voltage from the DC voltage bus 32 and converts the DC voltage into an AC voltage. A transformer 34 is provided between the grid-side converter 30 and the AC power grid 36. The transformer 34 is configured to provide isolation between the grid-side converter 30 and the AC power grid 36, and to boost the output voltage of the grid-side converter 30 to a voltage suitable to be delivered by the AC power grid 36. It may be understood that in other embodiments, the DC voltage of the DC bus 32 is directly converted into an AC voltage having an appropriate frequency and amplitude by one DC-AC converter or grid-side converter, to be supplied to the AC power grid 36 for delivery. In some embodiments, the power generation system 100 further comprises a rotor-side controller (not shown) and a grid-side controller (not shown), for controlling the rotor-side converter 28 and the grid-side converter 30 respectively.

In the present embodiment, the first switch unit $K_1$ comprises switch elements 40 and 42. The switch element 40 is provided between the rotor-side converter 28 and the AC generator 26, and the switch element 42 is provided between the grid-side converter 30 and the AC power grid 36. The switch elements 40 and 42 may be used to connect or disconnect the power generation unit 11 and the converters 28, 30, so as to connect or disconnect the energy storage unit 15 with or from the power generation unit 11. In another embodiment, the rotor-side converter 28 and the grid-side converter 30 may serve as the first switch unit $K_1$, and the switch elements 40 and 42 may be omitted. The converters 28 and 30 are switch element groups respectively, comprising a number of switch elements connected with each other. The current may be controlled to pass or prohibited to pass by controlling opening and closing of the switches of the converters 28 and 30 via the controller 19, so as to control connection or disconnection of the energy storage unit 15 and the power generation unit 11. In the present embodiment, the power generation system 100 further comprises a switch 44 arranged between the power generation unit 11 and the AC power grid 36, which may be used to connect or disconnect the power generation unit 11 and the AC power grid 36. When the power generation unit 11 is idle, the switch 44 may be opened so as to disconnect the power generation unit 11 from the AC power grid 36. When the power generation unit 11 operates normally, the switch 44 is closed.

In the present embodiment, the energy storage unit 15 is connected to the DC voltage bus 46 connected with the power generation unit 12 via the second switch unit $M_1$ that connects or disconnects the energy storage unit 15 with or from the power generation unit 12. The detailed structures, operations and the like of the power generation units 12 and 13 are similar to those of the power generation unit 11, the switch units $K_2$ and $K_3$ are similar to the switch unit $K_1$, the switch units $M_2$ and $M_3$ are similar to the switch unit $M_1$, and the energy storage units 16 and 17 are similar to the energy storage unit 15. Description is made in details only taking the power generation unit 11 and its corresponding switch units $K_1$, $M_1$ and the energy storage unit 15 as an example herein.

Figure 3:
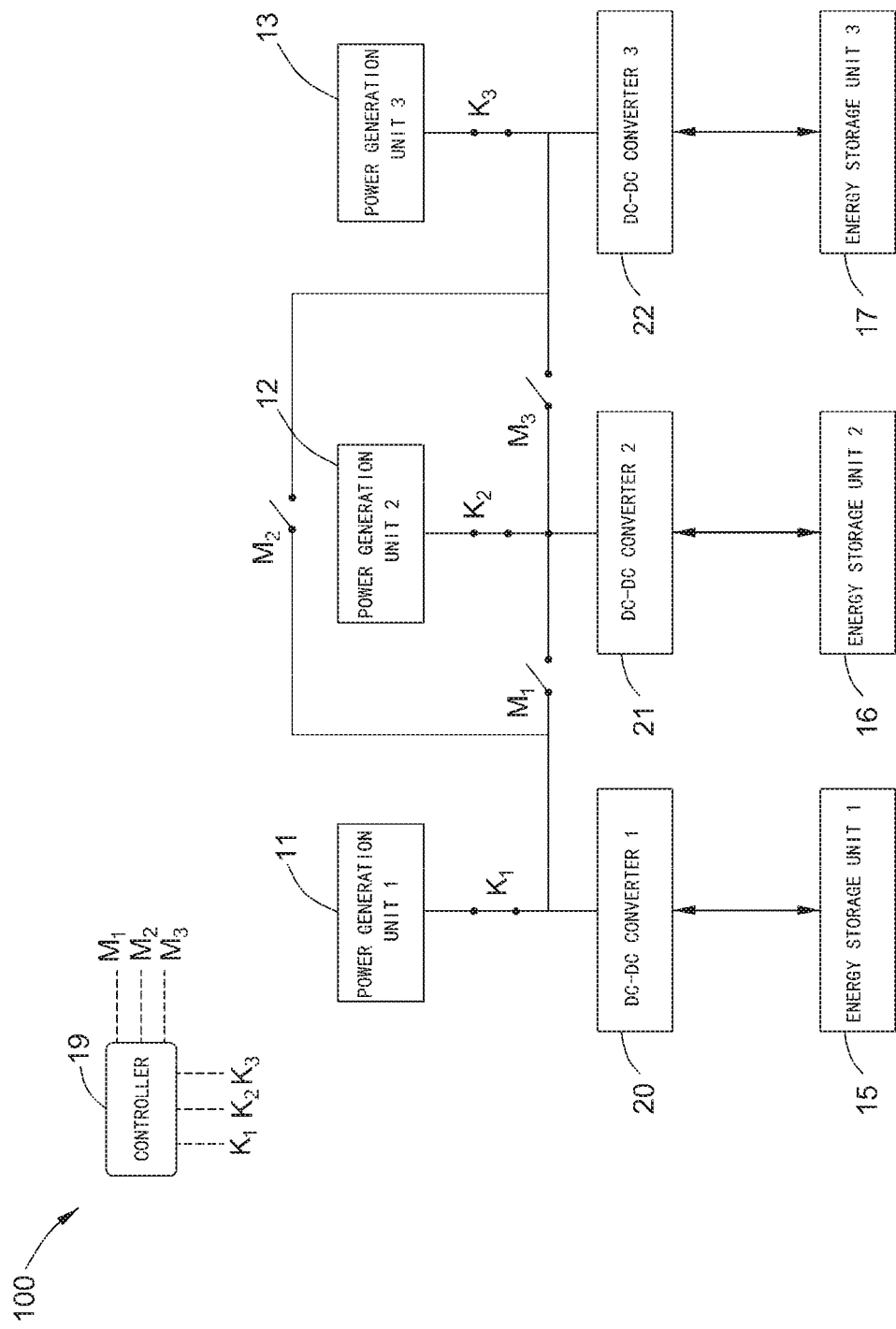
FIG. 3 illustrates a schematic block diagram when all the power generation units of the power generation system shown in FIG. 1 operate normally.

FIG. 3 illustrates a schematic block diagram of the power generation system 100 when all the power generation units 11-13 operate normally. If the power generation units 11-13 all operate normally, the power generation units 11-13 may produce expected electric power. At this moment, the first switch units $K_1$-$K_3$ are all closed, and the second switch units $M_1$-$M_3$ are opened, thus the power generation units 11-13 are respectively electrically connected with the energy storage units 15-17 one by one.

Figure 4:
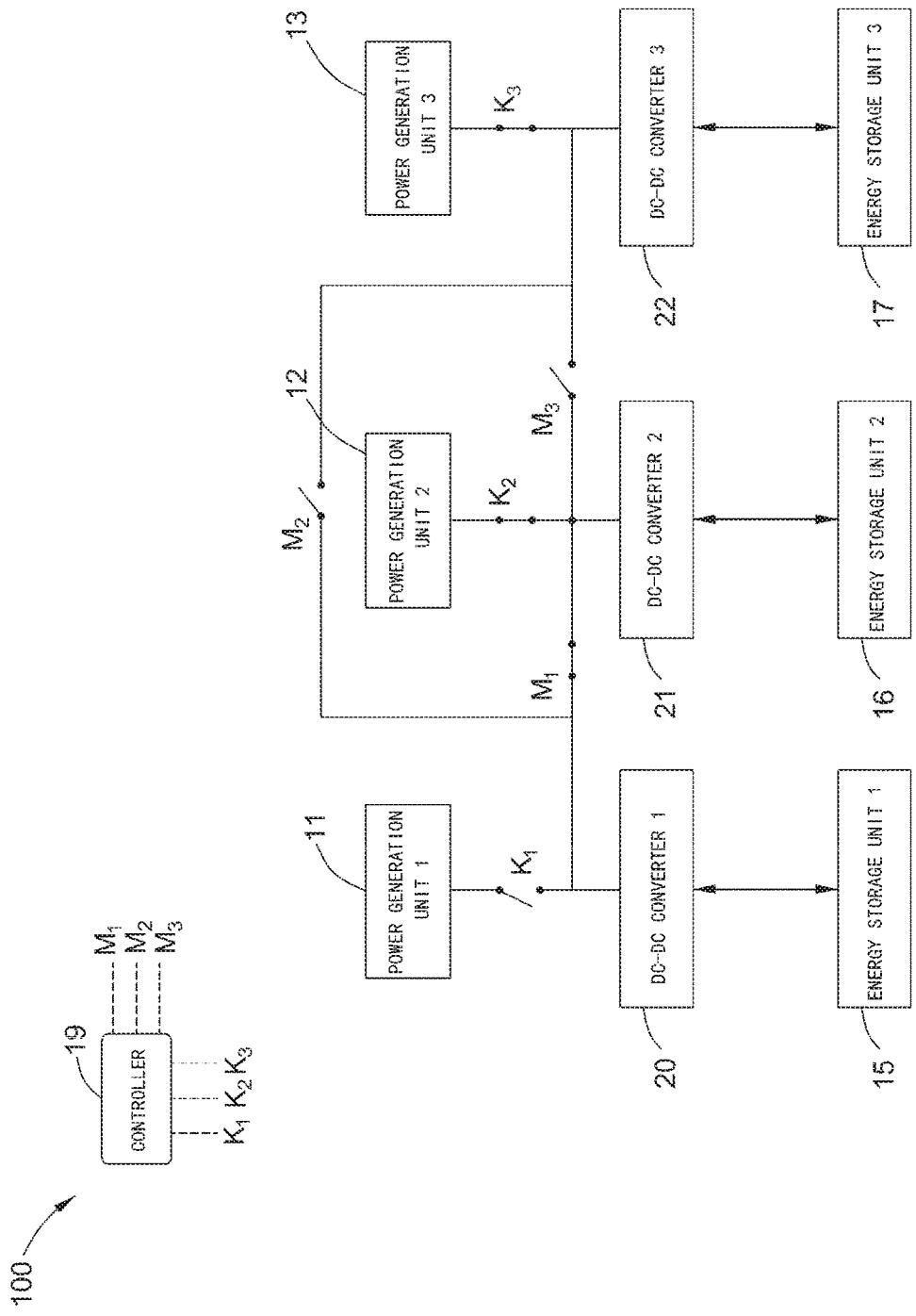
FIG. 4 illustrates a schematic block diagram of one embodiment of the power generation system shown in FIG. 1, when one of the power generation units is idle.

FIG. 4 illustrates a schematic block diagram of the power generation system 100 when one power generation unit 11 is idle. As one example, the power generation unit 11 in FIG. 4 is idle, and the power generation units 12 and 13 operate normally. The controller 19 is used to control the switch units $K_1$-$K_3$, $M_1$-$M_3$ to disconnect the idle power generation unit 11 from its corresponding energy storage unit 15, and to connect the disconnected energy storage unit 15 to one operating power generation unit 12 or 13 based on states-of-charge (SOC) of the energy storage units 15-17. SOC refers to a ratio of an amount of charge of an energy storage unit (i.e., the remaining energy) with a maximum amount of charge that can be stored in the energy storage unit, which is generally represented in percentage. SOC may be represented in percentage of a square of a voltage of an energy storage unit with a square of a maximum rated voltage of the energy storage unit. In the present embodiment, the controller 19 controls the first switch unit $K_1$ to be opened, so as to disconnect the energy storage unit 15 from the power generation unit 11 and to disconnect the power generation unit 11 from the power grid (not shown). And the controller 19 selects one power generation unit 12 or 13 at least based on SOCs of the energy storage units 15-17, and connects the disconnected energy storage unit 15 to the selected power generation unit 12 or 13. In the present embodiment, the controller 19 controls the second switch $M_1$ to be closed, to electrically connect the energy storage unit 15 to the power generation unit 12, so that the energy storage units 15 and 16 are electrically connected to the power generation unit 12 together to receive the excessive energy or release a part of energy. For purpose of illustration, FIG. 4 shows a specific embodiment, but is not limited thereto. In other embodiments, perhaps another power generation unit is idle, or a plurality of power generation units are idle.

In one embodiment, when the SOC of the disconnected energy storage unit 15 is less than a lower threshold, the controller 19 controls the second switches $M_1$-$M_3$ to connect the energy storage unit 15 to the energy storage unit 16 with a highest SOC and its corresponding power generation unit 12. If the SOC of the disconnected energy storage unit 15 is less than the lower threshold, it shows that the SOC of the energy storage unit 15 is lower, the energy storage unit 15 with a lower SOC will be connected to the energy storage unit 16 with a higher SOC. The energy storage units 15 and 16 are electrically connected to the power generation unit 12 together to receive or release electric energy. The combination of the energy storage units 15 and 16 makes the energy storage units have a larger space preparing to receive the excessive electric energy and also have enough reserved electric energy released to the power grid, more particularly making use of the energy storage units.

When the SOC of the energy storage unit 15 is greater than a higher threshold, the energy storage unit 15 will be connected to the energy storage unit 16 with a lowest SOC and its corresponding power generation unit 12. If the SOC of the disconnected energy storage unit 15 is greater than the higher threshold, it shows that the SOC of the energy storage unit 15 is higher, the energy storage unit 15 with a higher SOC will be connected to the energy storage unit 12 with a lower SOC, which may also more particularly make use of the energy storage units.

When the SOC of the energy storage unit 15 is between the lower threshold and the higher threshold, the SOCs of the energy storage units 16 and 17 and reciprocals of the SOCs are compared. One maximum of the SOCs and their reciprocals of those energy storage units 16 and 17 are obtained, and the energy storage unit 15 is connected to the energy storage unit 16 with this maximum and its corresponding power generation unit 12.

The lower threshold and the higher threshold may be set according to the practical application and the characteristics of the energy storage units. For example, the lower threshold may be set according to the characteristic of the battery. When the SOC of the battery is too low (i.e., power capacity of the battery is too low), continuing to discharge will affect the life of the battery. The lower threshold may be set to be no more than 50%, e.g., 20% or 10%, but is not limited thereto. The higher threshold may be set to be no less than 50%, e.g., ⅔, but is not limited thereto.

In another embodiment, the controller 19 selects one power generation unit 12 or 13 based on the SOCs of the energy storage units 15-17 and distances from the disconnected energy storage unit 15 to the operating power generation units 12, 13. In one embodiment, the distances from the disconnected energy storage unit 15 to the operating power generation units 12, 13 are lengths of cables connecting the energy storage unit 15 to the power generation units 12, 13.

When the SOC of the disconnected energy storage unit 15 is less than the lower threshold, the controller 19 is used to control the switch units $M_1$-$M_3$ to connect the disconnected energy storage unit 15 to one operating power generation unit 12 based on first indicators $C_L$ of the operating power generation units 12, 13. The relationship between the first indicator $C_L$ and SOC is opposite to the relationship between the first indicator $C_L$ and a distance. In one embodiment, the first indicator $C_L$ has a positive correlation with SOC, and the first indicator $C_L$ has a negative correlation with a distance. The "positive correlation" means that a value of a dependent variable will increase or decrease as an argument value increases or decreases. The first indicator $C_L$ herein will increase or decrease as the SOC increases or decreases. The "negative correlation" means that a value of a dependent variable will increase or decrease as an argument value decreases or increases. The first indicator $C_L$ herein will increase or decrease as the SOC decreases or increases. The relationships between the first indicator $C_L$ and the SOC, the distance are shown in Expression (1):

$$C_L(i) = \frac{S_i}{f_1(l_i)} \quad (1)$$

Note that i is a code of the operating power generation unit and energy storage unit, in order to distinguish a plurality of power generation units and distinguish a plurality of energy storage units. $S_i$ represents SOC of the ith energy storage unit. $l_i$ represents a distance from the disconnected energy storage unit 15 to the ith power generation unit. $f_1(\bullet)$ is a monotonically increasing function. The controller 19 controls the switch units $M_1$-$M_3$ to connect the disconnected energy storage unit 15 to an operating power generation unit with a maximum of first indicators $C_L$, such that the energy storage unit 15 is electrically connected to one power generation unit with a higher SOC and being nearer. The energy storage unit 15 is electrically connected to a nearer power generation unit, such that a length of a transmission cable between the two is shorter, which may reduce energy loss on the transmission cable.

When the SOC of the disconnected energy storage unit 15 is greater than the higher threshold, the controller 19 is used to control the switch units $M_1$-$M_3$ to connect the disconnected energy storage unit 15 to one operating power generation unit 12 based on second indicators $C_H$ of the operating power generation units 12, 13. In one embodiment, the second indicator $C_H$ has a negative correlation with SOC, and the second indicator $C_H$ has a negative correlation with a distance. The relationships between the second indicator $C_H$ and the SOC, the distance are shown in Expression (2):

$$C_H(i) = \frac{1}{S_i f_1(l_i)} \quad (2)$$

The disconnected energy storage unit 15 is electrically connected to an operating power generation unit with a maximum of second indicators $C_H$, such that the energy storage unit 15 is electrically connected to one power generation unit with a lower SOC and being nearer. A factor of distances from the disconnected energy storage unit 15 to the operating power generation units is scaled while taking the SOC into account. A value for balancing the SOC and the distances is obtained by the first indicator $C_L$ and the second indicator $C_H$, thus one power generation unit is selected such that the energy storage unit 15 may be made best use reasonably.

When the SOC of the disconnected energy storage unit 15 is between the higher threshold and the lower threshold, the controller 19 is used to control the switch units $M_1$-$M_3$ to connect the disconnected energy storage unit 15 to one operating power generation unit 12 based on the first indicators $C_L$ and the second indicators $C_H$ of the operating power generation units. In one embodiment, the first indicator $C_L$ is shown in Expression (1), and the second indicator $C_H$ is shown in Expression (2). First indicators $C_L$ and second indicators $C_H$ of a plurality of operating power generation units 12 and 13 are compared to obtain a maximum, and the disconnected energy storage unit 15 is connected to the power generation unit with the maximum.

In another embodiment, the first indicator $C_L$ has a negative correlation with SOC, and the first indicator $C_L$ has a positive correlation with a distance. The relationships between the first indicator $C_L$ and the SOC, the distance are shown in Expression (3):

$$C_L(i) = \frac{f_1(l_i)}{S_i} \tag{3}$$

When the SOC of the disconnected energy storage unit 15 is less than the lower threshold, the disconnected energy storage unit 15 is electrically connected to an operating power generation unit with a minimum of the first indicators $C_L$.

The second indicator $C_H$ has a positive correlation with SOC, and the second indicator $C_H$ has a positive correlation with a distance. The relationships between the second indicator $C_H$ and the SOC, the distance are shown in Expression (4):

$$C_H(i) = S_i f_1(l_i) \tag{4}$$

When the SOC of the disconnected energy storage unit 15 is greater than the higher threshold, the disconnected energy storage unit 15 is electrically connected to an operating power generation unit with a minimum of the second indicators $C_H$.

When the SOC of the disconnected energy storage unit 15 is between the higher threshold and the lower threshold, first indicators $C_L$ and second indicators $C_H$ of a plurality of operating power generation units 12 and 13 are compared to obtain a minimum, and the disconnected energy storage unit 15 is electrically connected to the power generation unit with the minimum. The first indicator $C_L$ is shown in Expression (3), and the second indicator $C_H$ is shown in Expression (4).

In another embodiment, the controller 19 selects one power generation unit 12 or 13 based on the SOCs of the energy storage units 15-17 and remaining life cycles of the energy storage units 16, 17. Life cycles of the energy storage units 15-17 refer to total numbers of charging and discharging of the energy storage units. For example, generally, the number of charging and discharging of a battery is about 2000 or 3000. A remaining life cycle refers to the remaining number of charging and discharging. If an energy storage unit is discharged deeper, e.g., discharged to a moment when the remaining power capacity is less than 50% of the total capacity of the energy storage unit, it may be counted as one charging and discharging; if an energy storage unit is charged more, e.g., charged to close to the total capacity of the energy storage unit, it may be counted as one charging and discharging.

The first indicator $C_L$ has a positive correlation with the SOC and the first indicator $C_L$ has a negative correlation with the remaining life cycle of an energy storage unit. The relationships between the first indicator $C_L$ and the SOC, the remaining life cycle are shown in Expression (5):

$$C_L(i) = \frac{S_i}{f_2(r_i)} \tag{5}$$

Note that $r_i$ is remaining life cycle of the ith energy storage unit. $f_2(\bullet)$ is a monotonically increasing function. When the SOC of the disconnected energy storage unit 15 is less than the lower threshold, the disconnected energy storage unit 15 is electrically connected to an operating power generation unit with a maximum of the first indicators $C_L$, such that the energy storage unit 15 is connected to one power generation unit with a higher SOC and the energy storage unit corresponding to the power generation unit has a shorter life cycle. The disconnected energy storage unit 15 may share the input and output electric energy of the energy storage unit 16 corresponding to the operating power generation unit 12, such that the number of deep charging or discharging of the energy storage unit 16 may be decreased, thus slowing down life consumption of the energy storage unit 16 and prolonging the whole life cycle of the power generation system 100.

The second indicator $C_H$ has a negative correlation with SOC, and the second indicator $C_H$ has a negative correlation with a remaining life cycle. The relationships between the second indicator $C_H$ and the SOC, the remaining life cycle are shown in Expression (6):

$$C_H(i) = \frac{1}{S_i f_2(r_i)} \tag{6}$$

When the SOC of the disconnected energy storage unit 15 is greater than the higher threshold, the disconnected energy storage unit 15 is electrically connected to an operating power generation unit with a maximum of the second indicators $C_H$, such that the energy storage unit 15 is electrically connected to one power generation unit with a lower SOC and the energy storage unit corresponding to the power generation unit has a shorter life cycle. A factor of a remaining life cycle of an energy storage unit is scaled while taking the SOC into account. A value for balancing the SOC and the remaining life cycle is obtained by the first indicator $C_L$ and the second indicator $C_H$.

When the SOC of the disconnected energy storage unit 15 is between the higher threshold and the lower threshold, first indicators $C_L$ and second indicators $C_H$ of a plurality of operating power generation units 12 and 13 are compared to obtain a maximum, and the disconnected energy storage unit 15 is electrically connected to the power generation unit with the maximum. The first indicator $C_L$ is shown in Expression (5), and the second indicator $C_H$ is shown in Expression (6).

In another embodiment, the first indicator $C_L$ has a negative correlation with the SOC and the first indicator $C_L$ has a positive correlation with the remaining life cycle of an energy storage unit. The relationships between the first indicator $C_L$ and the SOC, the remaining life cycle are shown in Expression (7):

$$C_L(i) = \frac{f_2(r_i)}{S_i} \tag{7}$$

When the SOC of the disconnected energy storage unit 15 is less than the lower threshold, the disconnected energy storage unit 15 is connected to an operating power generation unit with a minimum of the first indicators $C_L$.

The second indicator $C_H$ has a positive correlation with SOC, and the second indicator $C_H$ has a positive correlation with a remaining life cycle. The relationships between the second indicator $C_H$ and the SOC, the remaining life cycle are shown in Expression (8):

$$C_H(i) = S_i \cdot f_2(r_i) \tag{8}$$

When the SOC of the disconnected energy storage unit 15 is greater than the higher threshold, the disconnected energy storage unit 15 is electrically connected to an operating power generation unit with a minimum of the second indicators $C_H$.

When the SOC of the disconnected energy storage unit 15 is between the higher threshold and the lower threshold, first indicators $C_L$ and second indicators $C_H$ of a plurality of operating power generation units 12 and 13 are compared to obtain a minimum, and the disconnected energy storage unit 15 is electrically connected to the power generation unit with the minimum. The first indicator $C_L$ is shown in Expression (7), and the second indicator $C_H$ is shown in Expression (8).

In another embodiment, the controller 19 selects one power generation unit 12 or 13 based on the SOCs of the energy storage units 15-17, distances from the disconnected energy storage unit 15 to the operating power generation units 12, 13 and the remaining life cycles of the energy storage units 16, 17.

The first indicator $C_L$ has a positive correlation with the SOC, the first indicator $C_L$ has a negative correlation with the distance, and the first indicator $C_L$ has a negative correlation with the remaining life cycle of the energy storage unit. The relationships between the first indicator $C_L$ and the SOC, the distance and the remaining life cycle are shown in Expression (9):

$$C_L(i) = \frac{S_i}{f_1(l_i) \cdot f_2(r_i)} \tag{9}$$

When the SOC of the disconnected energy storage unit 15 is less than the lower threshold, the disconnected energy storage unit 15 is electrically connected to an operating power generation unit with a maximum of the first indicators $C_L$, such that the energy storage unit 15 is connected to one power generation unit with a higher SOC and being nearer, and the energy storage unit corresponding to the power generation unit has a shorter life cycle.

The second indicator $C_H$ has a negative correlation with the SOC, the second indicator $C_H$ has a negative correlation with the distance, and the second indicator $C_H$ has a negative correlation with the remaining life cycle. The relationships between the second indicator $C_H$ and the SOC, the distance and the remaining life cycle are shown in Expression (10):

$$C_H(i) = \frac{1}{S_i \cdot f_1(l_i) \cdot f_2(r_i)} \tag{10}$$

When the SOC of the disconnected energy storage unit 15 is greater than the higher threshold, the disconnected energy storage unit 15 is electrically connected to an operating power generation unit with a maximum of the second indicators $C_H$, such that the energy storage unit 15 is connected to one power generation unit with a lower SOC and being nearer, and the energy storage unit corresponding to the power generation unit has a shorter life cycle. Factors of distances from the disconnected energy storage unit to the operating power generation units and a remaining life cycle of the energy storage unit are scaled while taking the SOC into account. A value for balancing the SOC, the distances and the remaining life cycle is obtained by the first indicator $C_L$ and the second indicator $C_H$.

When the SOC of the disconnected energy storage unit 15 is between the higher threshold and the lower threshold, first indicators $C_L$ and second indicators $C_H$ of a plurality of operating power generation units 12 and 13 are compared to obtain a maximum, and the disconnected energy storage unit 15 is electrically connected to the power generation unit with the maximum. The first indicator $C_L$ is shown in Expression (9), and the second indicator $C_H$ is shown in Expression (10).

In another embodiment, the first indicator $C_L$ has a negative correlation with the SOC, the first indicator $C_L$ has a positive correlation with the distance, and the first indicator $C_L$ has a positive correlation with the remaining life cycle of the energy storage unit. The relationships between the first indicator $C_L$ and the SOC, the distance and the remaining life cycle are shown in Expression (11):

$$C_L(i) = \frac{f_1(l_i) \cdot f_2(r_i)}{S_i} \tag{11}$$

When the SOC of the disconnected energy storage unit 15 is less than the lower threshold, the disconnected energy storage unit 15 is electrically connected to an operating power generation unit with a minimum of the first indicators $C_L$.

The second indicator $C_H$ has a positive correlation with the SOC, the second indicator $C_H$ has a positive correlation with the distance, and the second indicator $C_H$ has a positive correlation with the remaining life cycle. The relationships between the second indicator $C_H$ and the SOC, the distance and the remaining life cycle are shown in Expression (12):

$$C_H(i) = S_i \cdot f_1(l_i) \cdot f_2(r_i) \tag{12}$$

When the SOC of the disconnected energy storage unit 15 is greater than the higher threshold, the disconnected energy storage unit 15 is electrically connected to an operating power generation unit with a minimum of the second indicators $C_H$.

When the SOC of the disconnected energy storage unit 15 is between the higher threshold and the lower threshold, first indicators $C_L$ and second indicators $C_H$ of a plurality of operating power generation units 12 and 13 are compared to obtain a minimum, and the disconnected energy storage unit 15 is electrically connected to the operating power generation unit with the minimum. The first indicator $C_L$ is shown in Expression (11), and the second indicator $C_H$ is shown in Expression (12).

Figure 5:
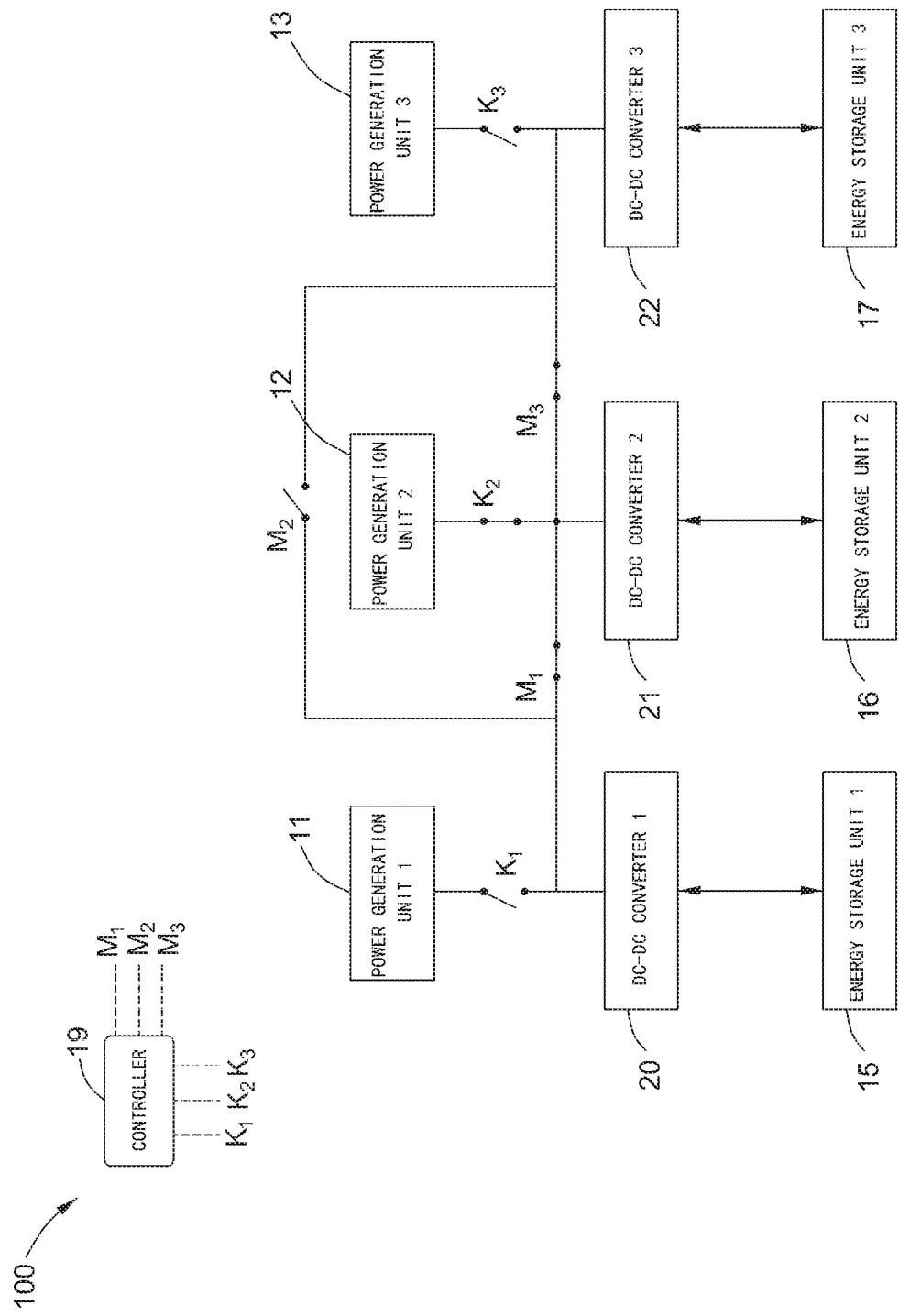
FIG. 5 illustrates a schematic block diagram of one embodiment of the power generation system shown in FIG. 1, when two of the power generation units are idle.

FIG. 5 illustrates a schematic block diagram of the power generation system 100 when two power generation units 11 and 13 are idle. At this moment, the first switch units $K_1$ and $K_3$ are opened, and the power generation units 11 and 13 are disconnected from the power grid, the second switch units $M_1$ and $M_3$ are closed, such that the energy storage units 15 and 17 are electrically connected to the power generation unit 12. In some embodiments, more power generation units are utilized. The principle for selecting a power generation unit to be connected by a plurality of disconnected energy storage units is similar to the embodiments as described in the above statements.

When the disconnected energy storage unit is electrically connected to one operating power generation unit, two or more energy storage units receive or release electric energy together. The controller 19 is used to split a total power among a plurality of energy storage units electrically connected to one power generation unit based on the SOCs of the energy storage units.

When the energy storage units receive the electric energy generated by the power generation unit for charge, a power for charging each energy storage unit has a negative correlation with the SOC of the energy storage unit. Therefore, if the SOC of the energy storage unit is higher, the charged power capacity is lower. The power for charging the energy storage unit, $P_{chg,i}$, is shown in Expression (13):

$$P_{chg,i} = \frac{1/S_i}{\sum_{j=1}^{n}(1/S_j)} \cdot P \qquad (13)$$

Note that i is a code of the energy storage unit, in order to distinguish a plurality of energy storage units electrically connected to one power generation unit. $S_i$ represents SOC of the ith energy storage unit. n is a total number of energy storage units electrically connected to one power generation unit. P is a total power. Thus, a sum of the powers received by these energy storage units is equal to the total power.

When the energy storage units release electric energy to the power grid, the power for discharging each energy storage unit has a positive correlation with the SOC of the energy storage unit. Therefore, if the SOC of the energy storage unit is higher, the discharged power capacity is higher. The power for discharging the energy storage unit, $P_{disc,i}$, is shown in Expression (14):

$$P_{disc,i} = \frac{S_i}{\sum_{j=1}^{n} S_j} \cdot P \qquad (14)$$

Thus, a sum of the powers released by these energy storage units is equal to the total power.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power generation system comprising:
   a plurality of power generation units;
   a plurality of corresponding energy storage units connected to the power generation units;
   a plurality of switch units for connecting or disconnecting the power generation units and the energy storage units; and
   a controller for controlling the switch units to disconnect one power generation unit from the corresponding energy storage unit when the one power generation unit stops operating and to connect the disconnected energy storage unit to one operating power generation unit of the plurality of power generation units based on states-of-charge of the corresponding energy storage units,
   wherein the controller is used to further connect the disconnected energy storage unit to the one operating power generation unit based on distances from the disconnected energy storage unit to the operating power generation units.

2. The power generation system of claim 1, wherein, when a state-of-charge of the disconnected energy storage unit is less than a lower threshold, the controller is used to control the switch units to connect the disconnected energy storage unit to the one operating power generation unit, whose first indicator is maximum among the operating power generation units, the first indicator having positive correlations with the states-of-charge and negative correlations with the distances.

3. The power generation system of claim 1, wherein, when a state-of-charge of the disconnected energy storage unit is less than a lower threshold, the controller is used to control the switch units to connect the disconnected energy storage unit to the one operating power generation unit, whose first indicator is minimum among the operating power generation units, the first indicator having negative correlations with the states-of-charge and positive correlations with the distances.

4. The power generation system of claim 1, wherein, when a state-of-charge of the disconnected energy storage unit is greater than a higher threshold, the controller is used to control the switch units to connect the disconnected energy storage unit to the one operating power generation unit, whose second indicator is maximum among the operating power generation units, the second indicator having negative correlations with the states-of-charge and negative correlations with the distances.

5. The power generation system of claim 1, wherein, when a state-of-charge of the disconnected energy storage unit is greater than a higher threshold, the controller is used to control the switch units to connect the disconnected energy storage unit to the one operating power generation unit, whose second indicator is minimum among the operating power generation units, the second indicator having positive correlations with the states-of-charge and positive correlations with the distances.

6. The power generation system of claim 1, wherein, when a state-of-charge of the disconnected energy storage unit is between a higher threshold and a lower threshold, the controller is used to control the switch units to connect the disconnected energy storage unit to the one operating power generation unit, whose first indicator or second indictor is maximum among the operating power generation units, the first indicator having positive correlations with the states-of-charge and negative correlations with the distances, the second indicator having negative correlations with the states-of-charge and negative correlations with the distances.

7. The power generation system of claim 1, wherein, when a state-of-charge of the disconnected energy storage unit is between a higher threshold and a lower threshold, the controller is used to control the switch units to connect the disconnected energy storage unit to the one operating power generation unit, whose first indicator or second indicator is minimum among the operating power generation units, the first indicator having a negative correlation with the states-of-charge and positive correlations with the distances, the second indicator having positive correlations with the states-of-charge and positive correlations with the distances.

8. The power generation system of claim 1, wherein the controller is used to further connect the disconnected energy storage unit to the one operating power generation unit based on remaining life cycles of the energy storage units.

9. The power generation system of claim 1, wherein the controller is used to split a total power among the plurality of energy storage units electrically connected to one of the power generation units based on the states-of-charge of the energy storage units.

* * * * *